United States Patent
Fang

(10) Patent No.: US 12,330,741 B2
(45) Date of Patent: Jun. 17, 2025

(54) SWINGABLE SHAFT-DRIVEN TRICYCLE

(71) Applicant: Ningbo Xinglong Juchuang Electrical Technology Co., Ltd., Ningbo (CN)

(72) Inventor: Jianhua Fang, Ningbo (CN)

(73) Assignee: Ningbo Xinglong Juchuang Electrical Technology Co., Ltd., Ningbo (CN)

(*) Notice: Subject to any disclaimer, the term of this patent is extended or adjusted under 35 U.S.C. 154(b) by 0 days.

(21) Appl. No.: 18/708,466

(22) PCT Filed: Mar. 8, 2022

(86) PCT No.: PCT/CN2022/079728
§ 371 (c)(1),
(2) Date: May 8, 2024

(87) PCT Pub. No.: WO2023/077702
PCT Pub. Date: Nov. 5, 2023

(65) Prior Publication Data
US 2025/0042507 A1    Feb. 6, 2025

(30) Foreign Application Priority Data
Nov. 8, 2021  (CN) .......................... 202111315926.6

(51) Int. Cl.
*B62M 17/00*      (2006.01)
*B62K 5/06*       (2006.01)
(Continued)

(52) U.S. Cl.
CPC ............... *B62M 17/00* (2013.01); *B62K 5/06* (2013.01); *B62M 6/50* (2013.01); *B62M 6/90* (2013.01); *B62M 11/02* (2013.01)

(58) Field of Classification Search
CPC .......... B62M 17/00; B62M 6/50; B62M 6/90; B62M 11/02; B62K 5/06
See application file for complete search history.

(56) References Cited

U.S. PATENT DOCUMENTS 3,592,487 A * 7/1971 Mansperger ............. B62J 15/02
                                                    280/282
4,132,435 A * 1/1979 Wilson ..................... B62K 5/10
                                                    280/282
(Continued)

FOREIGN PATENT DOCUMENTS

CN        1336882 A  *  2/2002  ............. B62M 6/65
CN      104554604 A  *  4/2015
(Continued)

*Primary Examiner* — Paul N Dickson
*Assistant Examiner* — Shams Dhanani
(74) *Attorney, Agent, or Firm* — Nitin Kaushik

(57) ABSTRACT

A swingable shaft-driven tricycle, comprising a front frame (1), a rear frame (2), and a transmission mechanism, the front frame (1) is connected to the rear frame (2) through a swinging mechanism (3), the transmission mechanism comprises a front torque output assembly (4) arranged on the front frame (1) and a second torque output assembly (5) arranged on the rear frame (2), wherein the first torque assembly (4) transmits torque to the second torque output assembly (5) through a transmission shaft (6), and the second torque output assembly (5) is in linkage cooperation with at least one of two rear wheels (72). The tricycle solves the problem in the prior art that when swinging occurs between a front frame and a rear frame, a transmission agent needs to swing along with the frames, thus causing poor transmission reliability, and solves the problem in the prior art that a chain is prone to falling off when affected by jolts and vibrations, thus affecting riding experience or even safety.

20 Claims, 18 Drawing Sheets

(51) Int. Cl.
*B62M 6/50* (2010.01)
*B62M 6/90* (2010.01)
*B62M 11/02* (2006.01)

(56) References Cited

U.S. PATENT DOCUMENTS

| | | | | |
|---|---|---|---|---|
| 4,572,535 A | * | 2/1986 | Stewart | B62K 5/10 280/282 |
| 2014/0265217 A1 | * | 9/2014 | Payne | B62K 21/00 475/331 |
| 2021/0061409 A1 | * | 3/2021 | Ricco | B60B 27/0047 |

FOREIGN PATENT DOCUMENTS

| | | | |
|---|---|---|---|
| CN | 105984537 | A | 10/2016 |
| CN | 208181344 | U | 12/2018 |
| CN | 109466672 | A | 3/2019 |
| CN | 113799909 | A | 12/2021 |
| DE | 4124926 | A1 | 1/1993 |

* cited by examiner

SWINGABLE SHAFT-DRIVEN TRICYCLE

PRIORITIES AND CROSS REFERENCES

This Application claims priority from International Application No. PCT/CN2022/079728 filed on 8 Mar. 2022, and Chinese Application No. 202111315926.6 filed on 8 Nov. 2021, the teachings of each of which are incorporated by reference herein in their entirety.

TECHNICAL FIELD OF THE INVENTION

The present invention relates to the field of tricycles, and in particular to a swingable shaft-driven tricycle.

BACKGROUND TECHNIQUE

As commonly used light vehicles in the daily life, pedal tricycles are as light as bicycles and can carry more articles. With the progress of technology, in order to save the rider's physical strength, electric boosting tricycles have emerged, in which a signal of crank shaft rotation is detected mainly relying on the torque sensor at the crank shaft, and then the controller controls the motor to supply power to the driving wheel of the tricycle, thus saving the rider's physical strength. Such boosting tricycles are essentially different from the electric motorcycle type tricycles, for example, the way of controlling the rotation of motor is different, no throttle is arranged on the handlebar in the electric boosting tricycle, the rider drives the crank shaft by pedaling, and the crank shaft triggers torque sensor, so that the controller controls the motor to drive the driving wheel of the tricycle, and it is more reliable in safety.

The main reason why the tricycle is easy to turn over when turning is that the center of gravity of the tricycle will shift to between the front wheel and the outer rear wheel when tricycle is turning a corner, so that the tricycle is very easy to tilt and turn over under the action of the centrifugal force. At present, it is mandatory stipulated in some countries that the passing width of the rear portion of the tricycle should not be greater than the front handlebar, since the width of the handlebar should not be too large, the wheel track between two rear wheels of the tricycle is small, and the two rear wheels are driven coaxially, so that the tricycle is very easy to tilt and turn over when turning a corner. For example, there are two requirements for tricycles in Japanese market. First, the total width of the tricycle is within 600 mm. Second, the frame of the tricycle is composed of front and rear frames, the front frame needs to have the function swinging axially from side to side during riding, and the rear frame keeps horizontal. When such a tricycle turns a corner, the front frame can twist at a certain angle relative to the rear frame, so that the center of gravity of the vehicle is moved toward the inner side of the curve, making the tricycle more stable and reliable when turning the corner. Since the front frame will directly drive the rear wheels through a conventional chain when swinging during riding, and the chain will be twisted in a FIG. 8 shape, and the torque is different for left and right twist. Thus, the riding safety is affected, and it is inconvenient to control the handlebar. Therefore, such tricycles are designed as a multi-section transmission agent. As shown in FIGS. 1 and 2, the tricycle includes a front frame 101 and a rear frame 102, wherein a support frame 1021 extending downward is arranged on the rear frame 102, and a swinging mechanism 111 is arranged on the support frame 1021; the front frame 101 is connected to the swinging mechanism 111, a first transmission sprocket 103 is arranged on one side of the rear portion of the front frame 101, and a second transmission sprocket 104 is arranged on the other side of the front portion of the rear frame 102; the first transmission sprocket 103 and the second transmission sprocket 104 are arranged opposite to each other and connected through a multi-stage universal joint 105, the first transmission sprocket 103 is in transmission connection to a driving sprocket 107 on a crank shaft of the front frame 101 through a first chain 106; and, the second transmission sprocket 104 is in transmission connection to a rear sprocket 109 on one rear wheel 110 through a second chain 108. When the front frame 101 tilts through the swinging mechanism 111, the first chain 106, the first transmission sprocket 103 and the driving sprocket 107 also tilt accordingly, and the multi-stage universal joint 105 changes in shape, thereby ensuring that the second transmission sprocket 104 is not subject to the stress caused by the tilting of the front frame 101, and maintaining the normal transmission of power. However, in the above technical solution, the power needs to pass through the first chain 106, the first transmission sprocket 103, the multi-stage universal joint 105, the second transmission sprocket 104, the second chain 108 and the rear sprocket 109 to drive the rear wheels 110 to rotate, this belongs to the multi-stage transmission, and the transmission loss is high, moreover, the parts of the transmission agent are greatly increased, and the assembling process is completed. The wheel track between two sprocket linked through the same chain is large, and there are two sets of chain transmission mechanisms, so the reliability is poor, the transmission agent has a small clearance from the ground and is easy to scrape and bump with objects on the ground during riding, so that the hidden danger of chain falling off cannot be solved, and the reliability is poor, the number of transmission components is large, the assembling efficiency is low.

SUMMARY OF THE INVENTION

The technical problem to be solved by the present invention is to overcome the deficiencies of the prior art and provide a swingable shaft-driven tricycle.

The swingable shaft-driven tricycle according to the present invention employs the following main technical scheme: The swingable shaft-driven tricycle comprises a front frame, a rear frame, and a transmission mechanism, with a front wheel being arranged on the front frame, two rear wheels being symmetrically arranged on the rear frame, and the front frame being connected to the rear frame through a swinging mechanism, wherein the transmission mechanism comprises a first torque output assembly arranged on the front frame and a second torque output assembly arranged on the rear frame; the first torque assembly transmits torque to the second torque output assembly through a transmission shaft; the second torque output assembly is in linkage cooperation with at least one of the two rear wheels; a transmission via hole is formed in a middle portion of the swinging mechanism, the transmission shaft passes through the transmission via hole, and the axis center line of the transmission shaft located in the transmission via hole coincides with the axis center line of the swinging mechanism.

The swingable shaft-driven tricycle provided by the present invention also employs the following auxiliary technical schemes:

a front beam is arranged on the assembly installation box, a front fork and a handlebar are arranged on the front beam, and the front wheel is arranged on the front fork.

One end of the transmission shaft cooperates with the first torque output assembly, while the other end of the transmission shaft passes through the transmission via hole to cooperates with the second torque output assembly.

The swinging mechanism comprises a first swinging member, a second swinging member, a connecting shaft and an elastic block, the elastic block is clamped between the first swinging member and the second swinging member, the first swinging member and the second swinging member are connected in a rotatable manner via the connecting shaft, the first swinging member is connected to the front frame; the second swinging member is connected to the rear frame; and, the transmission via hole is formed in a middle portion of the connecting shaft.

The first swinging member comprises a swinging shaft and a first connecting portion arranged at one end of the swinging shaft; the second swinging member comprises a shaft sleeve and a connecting cover sleeved on the shaft sleeve, a second connecting portion is arranged on the connecting cover; outer clamping slots are formed on the outer wall of the swinging shaft, and inner clamping slots are formed on the inner wall of the shaft sleeve; the other end of the swinging shaft is inserted into the shaft sleeve; the outer clamping slots are opposite to the inner clamping slots, one end of the elastic block is inserted into the inner clamping slots, while the other end of the elastic block is inserted into the outer clamping slots; a first insertion hole is formed in the middle portion of the swinging shaft, and a second insertion hole is formed on the connecting cover, the connecting shaft passes through the second insertion hole and the first insertion hole to connect the first swinging member to the second swinging member in a rotatable manner; and, the transmission via hole is formed in the middle portion of the connecting shaft.

The transmission shaft comprises at least two segmented transmission shafts, and two adjacent segmented transmission shafts are connected via a universal joint.

The transmission shaft comprises a first segmented transmission shaft, a second segmented transmission shaft and a third segmented transmission shaft; the first segmented transmission shaft and the second segmented transmission shaft are connected via a first universal joint, the second segmented transmission shaft and the third segmented transmission shaft are connected via a second universal joint, the first segmented transmission shaft cooperates with the first torque output assembly; and, the third segmented transmission shaft cooperates with the second torque output assembly.

The front frame comprises an assembly installation box and a hollow connecting beam arranged on the assembly installation box; one end of the hollow connecting beam is connected to the assembly installation box, while the other end of the hollow connecting beam is connected to the swinging mechanism, the transmission shaft penetrates through the hollow connecting beam; and, the first torque output assembly is arranged in the assembly installation box.

The rear frame comprises a wheel frame and a gear box arranged on the wheel frame, the gear box is connected to the swinging mechanism; the second torque output assembly is arranged in the gear box; and, the rear wheels are arranged on the wheel frame.

The wheel frame comprises a framework, two wheel installation members symmetrically arranged on the framework and wheel transmission shafts arranged on the wheel installation members, the rear wheels are arranged on the wheel transmission shafts; and, the second torque output assembly is at least connected to one of the wheel transmission shafts.

Brake pad mechanisms are arranged on the wheel installation members, brake drums or brake discs are arranged on the rear wheels, and the brake pad mechanisms cooperate with the brake drums or brake discs. Both the disc brake and the drum brake are mature mechanisms in the prior art and will not be repeated here.

The first torque output assembly comprises a middle shaft arranged in a rotatable manner on the front frame and cranks arranged at two ends of the middle shaft, and the middle shaft is in linkage with the transmission shaft through a first gear pair.

The first torque output assembly comprises a middle shaft and a rear shaft which are arranged in a rotatable manner on the front frame, a front sprocket which is arranged on the middle shaft, cranks which are arranged at two ends of the middle shaft, a rear sprocket and a first bevel gear which are arranged on the rear shaft, the front sprocket is in linkage cooperation with the rear sprocket through a chain; a second bevel gear is arranged on the transmission shaft; and, the first bevel gear is meshed with the second bevel gear.

The middle shaft and the rear shaft are arranged in parallel, and the transmission shaft is perpendicular to the rear shaft.

The first torque output assembly further comprises a tighten sprocket in compression cooperation with the chain.

The second torque output assembly comprises a torque output shaft arranged on the rear frame; the transmission shaft is in linkage with the torque output shaft through a second gear pair; a clutch assembly is arranged between the transmission shaft and the second gear pair or between the torque output shaft and the second gear pair; and, the torque output shaft is in linkage cooperation with at least one of the two rear wheels.

The second gear pair comprises a third bevel gear and a fourth bevel gear which are meshed with each other, the fourth bevel gear is arranged on the torque output shaft, and, the transmission shaft is in linkage with the third bevel gear through the clutch assembly.

The clutch assembly comprises a torque input shaft arranged on the third bevel gear, a first end face ratchet arranged on the torque input shaft, an internal spline sleeve clamped on the transmission shaft in a sliding manner, and an elastic member for pushing the internal spline sleeve to abut against the first end face ratchet; one end of the torque input shaft is connected to the third bevel gear, while the other end of the torque input shaft is provided with the first end face ratchet, an external spline is provided on the outer wall of the transmission shaft; the internal spline sleeve is in sliding clamping cooperation with the external spline; a second end face ratchet is arranged at the end of the internal spline sleeve opposite to the first end face ratchet; and, the first end face ratchet cooperates with the second end face ratchet.

The elastic member is a spring sleeved on the transmission shaft.

A positioning insertion hole is formed at the end of the torque input shaft opposite to the transmission shaft, and the end of the transmission shaft is inserted into the positioning insertion hole.

The third bevel gear, the torque input shaft and the first end face ratchet are of an integral structure.

The swingable shaft-driven tricycle further comprises a storage battery arranged on the front frame or the rear frame, a boosting motor arranged on the front wheel and a torque sensor arranged in the first torque output assembly; the torque sensor is electrically connected to the boosting motor; and, the storage battery is connected to the torque sensor and the boosting motor.

A torque trigger hole is formed on the torque sensor, the middle shaft penetrates through the torque trigger hole, and the rotation of the middle shaft triggers the torque sensor.

Compared with the prior art, the swingable shaft-driven tricycle according to the present invention has the following advantages: Compared with the prior art, in the present invention, the chain transmission of the conventional tricycle is changed into shaft transmission, and the transmission shaft is located in the plane where the center line of the frame is located. Firstly, the problem that when swinging occurs between the front frame and the rear frame in the prior art, the transmission agent needs to swing with the frames, resulting in poor transmission reliability is solved. Secondly, the problems in the prior art that a chain is prone to falling off when affected by jolts and vibrations, and affecting riding experience or even safety are solved. Thirdly, the shaft transmission solves the problem of high torque transmission loss caused by multi-stage chain transmission in the prior art. Finally, the center line of a section of the transmission shaft located in the transmission via hole coincides with the rotation center line of the swinging mechanism, so that the transmission shaft will not be subjected to any stress when the swinging mechanism swings, thereby ensuring the transmission performance of the present application. In conclusion, compared with the chain transmission mechanism in the prior art, the shaft transmission mechanism in the present application has the advantages of simple structure, easy assembling, high reliability, and free-of-maintenance for the transmission mechanism.

DETAILED DESCRIPTION OF THE INVENTION

Embodiment 1

Figure 1:
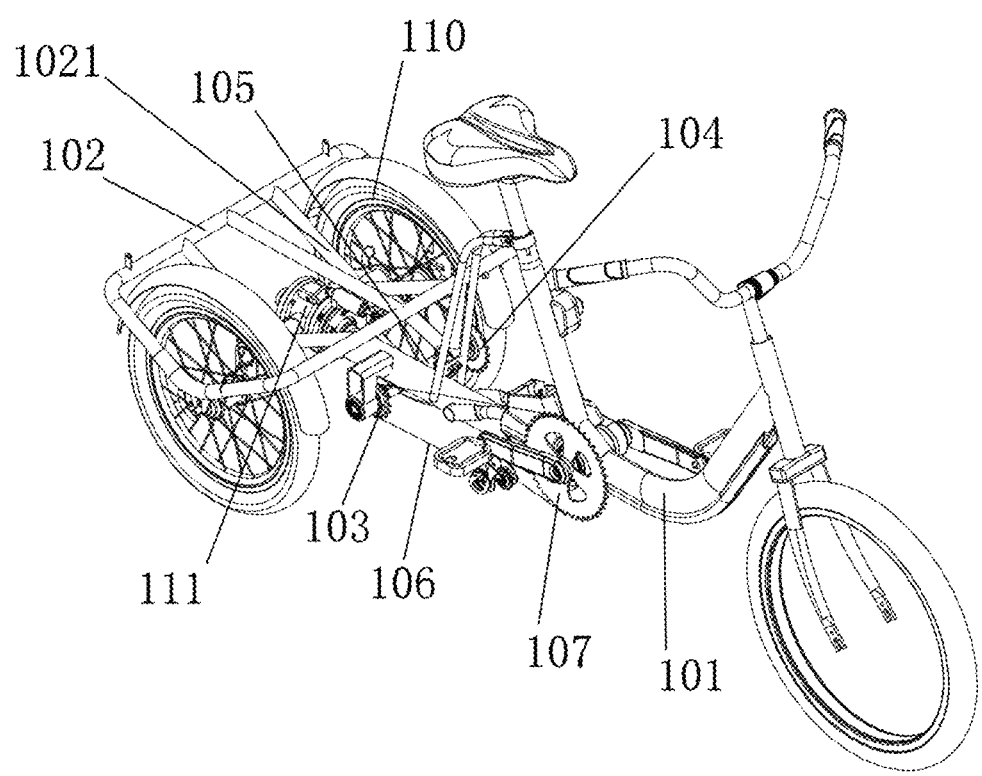
FIG. 1 is a structure diagram of a tricycle with a swingable frame in the prior art.

With reference to FIGS. 3-15, an embodiment of the swingable shaft-driven tricycle according to the present invention comprises a front frame 1, a rear frame 2 and a transmission mechanism, a front wheel 71 (the front wheel in the figures is a structure diagram) is arranged on the front frame 1, and two rear wheels 72 (the rear wheels in the figures are structure diagrams) are symmetrically arranged on the rear frame 2, the front frame 1 is connected in a swingable manner to the rear frame 2 through a swinging mechanism 3, the transmission mechanism comprises a first torque output assembly 4 arranged on the front frame 1 and a second torque output assembly 5 arranged on the rear frame 2, the first torque assembly 4 transmits torque to the second torque output assembly 5 through a transmission shaft 6; the second torque output assembly 5 is in linkage fit with at least one of the two rear wheels 72. A transmission via hole 331 is formed in a middle portion of the swinging mechanism 3, the transmission shaft 6 passes through the transmission via hole 331, and the axis center line of the transmission shaft 6 located in the transmission via hole 331 coincides with the axis center line of the swinging mechanism 3.

Compared with the prior art, in the present invention, the chain transmission of the conventional tricycle is changed into shaft transmission, and the transmission shaft 6 is located in the plane where the center line of the frame is located. Firstly, the problem that when swinging occurs between the front frame 1 and the rear frame 2 in the prior art, the transmission agent needs to swing with the frames, resulting in poor transmission reliability is solved. Secondly, the problems in the prior art that a chain is prone to falling off when affected by jolts and vibrations, and affecting riding experience or even safety are solved. Thirdly, the shaft transmission solves the problem of high torque transmission loss caused by multi-stage chain transmission in the prior art. Finally, the center line of a section of the transmission shaft 6 located in the transmission via hole 331 coincides with the rotation center line of the swinging mechanism 3, so that the transmission shaft 6 will not be subjected to any stress when the swinging mechanism 3 swings, thereby ensuring the transmission performance of the present application. In conclusion, compared with the chain transmission mechanism in the prior art, the shaft transmission mechanism in the present application has the advantages of simple structure, easy assembling, high reliability, and being free of maintenance for the transmission mechanism.

With reference to FIGS. 5-8, according to the above embodiment of the present invention, the swinging mechanism 3 comprises a first swinging member 31, a second swinging member 32, a connecting shaft 33 and an elastic block 34, the first swinging member 31 comprises a swinging shaft 311 and a first connecting portion 312 arranged at one end of the swinging shaft 311, the second swinging member 32 comprises a shaft sleeve 321 and a connecting cover 322 sleeved on the shaft sleeve 321, a second connecting portion 3222 is arranged on the connecting cover 322; Outer clamping slots 313 are formed on the outer wall of the swinging shaft 311, and inner clamping slots 3211 are formed on the inner wall of the shaft sleeve 321; The other end of the swinging shaft 311 is inserted into the shaft sleeve 321, the outer clamping slots 313 are opposite to the inner clamping slots 3211, one end of the elastic block 34 is inserted into the inner clamping slots 3211, while the other end of the elastic block 34 is inserted into the outer clamping slots 313; A first insertion hole 314 is formed in the middle portion of the swinging shaft 311, and a second insertion hole 3221 is formed on the connecting cover 322, the connecting shaft 33 passes through the second insertion hole 3221 and the first insertion hole 314 to connect the first swinging member 31 to the second swinging member 32 in a rotatable manner; The transmission via hole 331 is formed in the middle portion of the connecting shaft 33. The elastic block 34 may be a rubber elastic block. There are a plurality of outer clamping slots 313 which are uniformly formed on the outer wall of the swinging shaft 311, and there are a plurality of inner clamping slots 3211 which are uniformly formed on the inner wall of the shaft sleeve 321. A locking nut 332 is further provided on the connecting shaft 33, and the first swinging member 31 and the second swinging member 32 are connected in a rotatable manner by cooperating with the locking nut 322. A bearing 35 is arranged between the outer wall of the connecting shaft 33 and the inner wall of the first insertion hole 314. When the swinging mechanism is in a stationary state, the elastic block 34 is not deformed, when the first swinging member 31 is twisted relative to the second swinging member 32, the middle portion of the elastic block 34 is squeezed and deformed. With the automatic restoration of the elastic block 34, the first swinging member 31 is also restored to the initial state. Since the first swinging member 31 and the second swinging member 32 twist along the connecting shaft 33, the axis center line of the connecting shaft 33 is the axis center line of the swinging mechanism 3. The first connecting portion 312 of the swinging mechanism 3 is connected to the front frame 1 of the tricycle, and the second connecting portion 3222 is connected to the rear frame 2 of the tricycle, particularly, the transmission via hole 331 is provided for allowing the transmission shaft 6 to pass therethrough, so that the two rotating components of the swinging mechanism 3 and the transmission shaft 6 are organically combined, thus providing favorable conditions for the production of the swingable shaft-driven tricycle, and facilitating the simplification of the transmission mechanism of this tricycle, moreover, the swinging mechanism has simple and compact structure, few components, easy assembling and low production cost.

Figure 13:
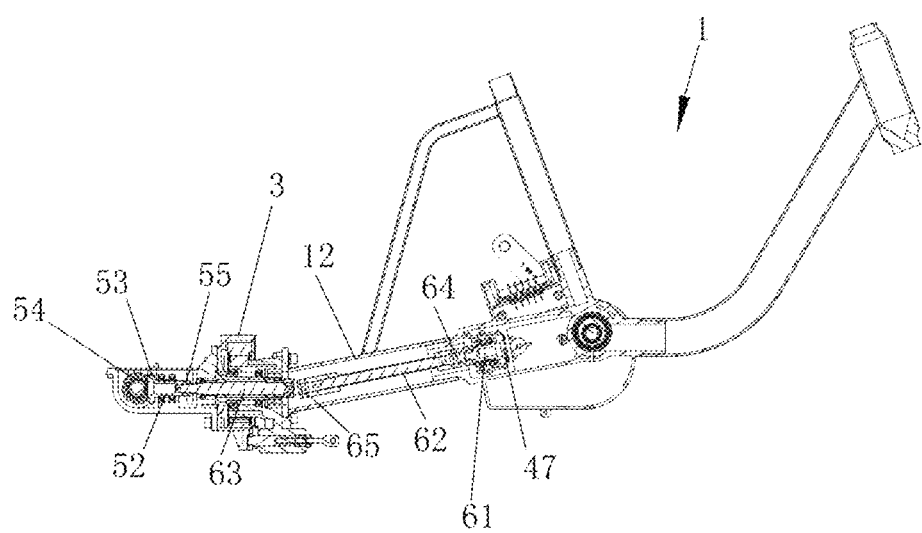
FIG. 13 is a partially sectional view of a part of the front frame, the swinging mechanism and a part of the rear frame after being assembled together according to the present invention.
Figure 14:
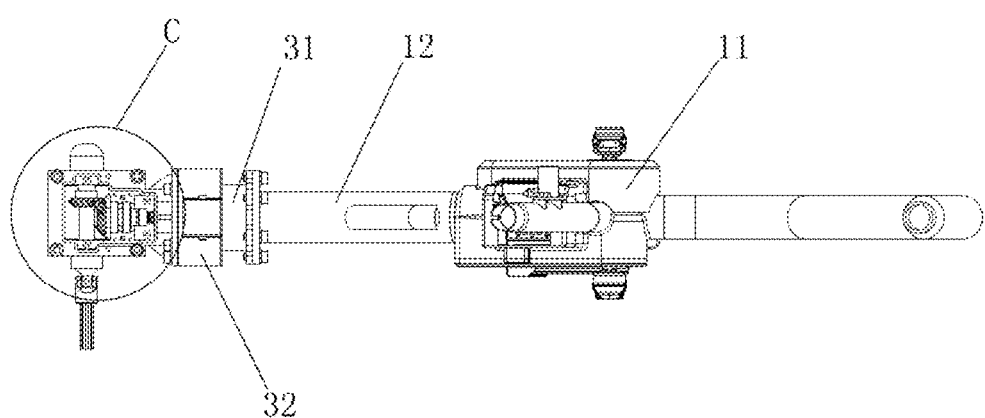
FIG. 14 is a top view of a part of the front frame, the swinging mechanism and a part of the rear frame after being assembled together according to the present invention.
Figure 15:
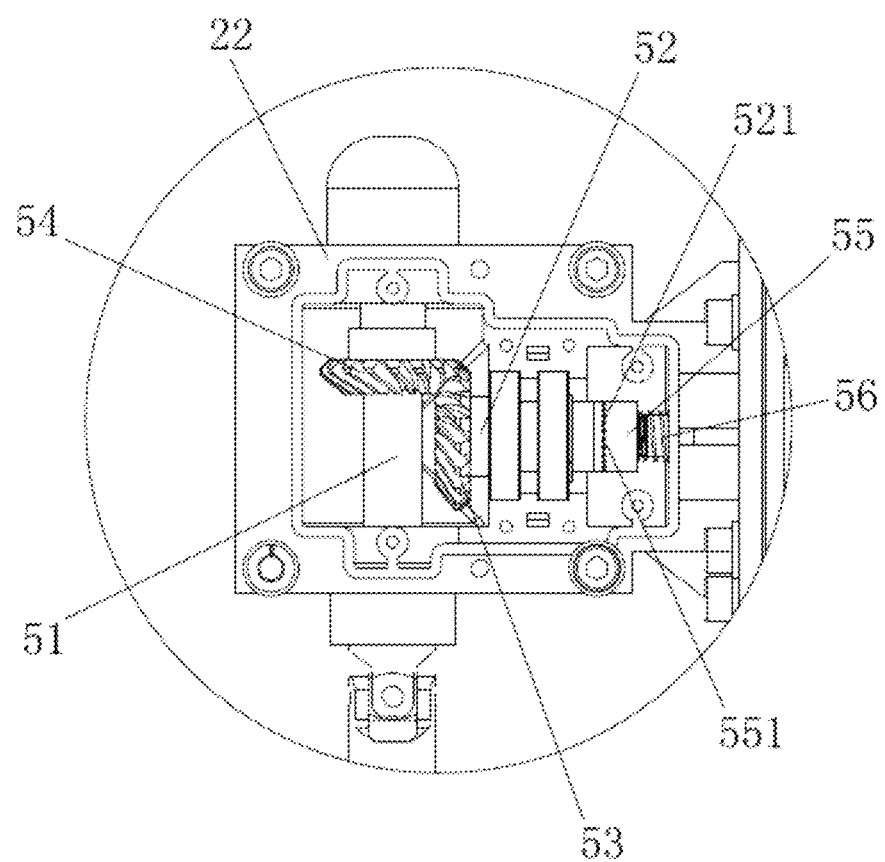
FIG. 15 is an enlarged view of C in FIG. 14.
Figure 16:
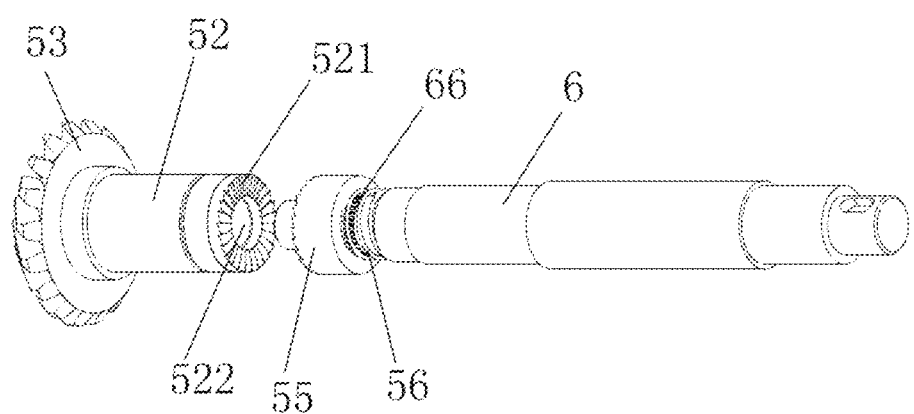
FIG. 16 is a first exploded view of the clutch assembly according to the present invention.
Figure 17:
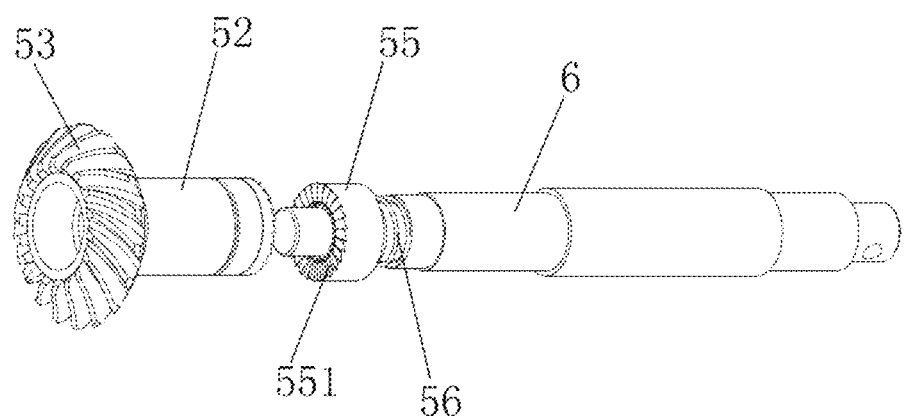
FIG. 17 is a second exploded view of the clutch assembly according to the present invention.
Figure 18:
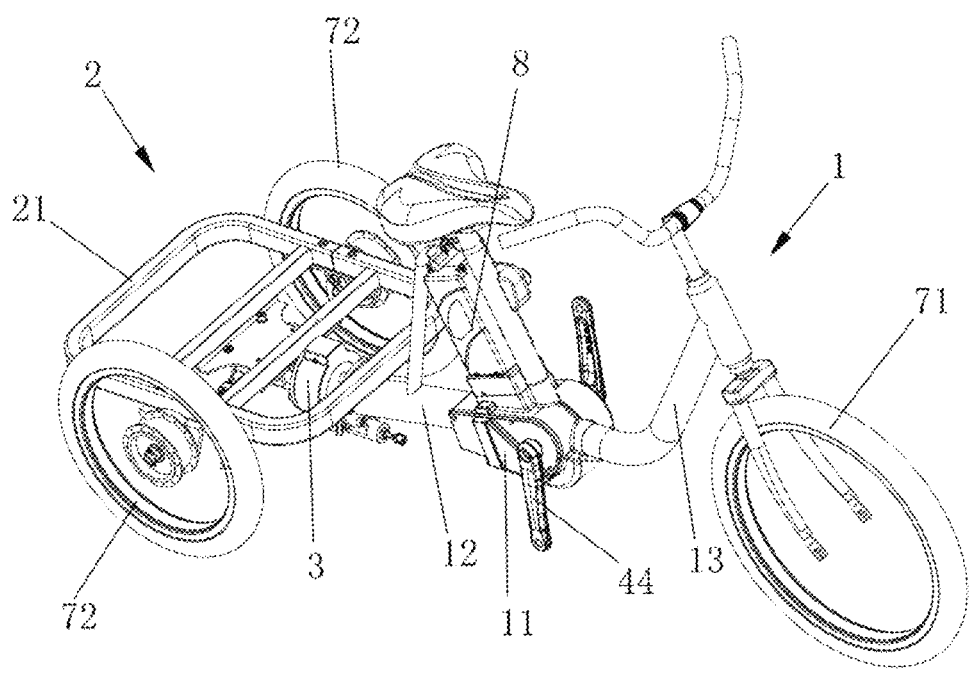
FIG. 18 is a structure diagram of the swingable shaft-driven tricycle after being equipped with the storage battery according to the present invention.

With reference to FIG. 13, according to the above embodiment of the present invention, the transmission shaft 6 comprises at least two segmented transmission shafts 6, and two adjacent segmented transmission shafts 6 are connected via a universal joint. By using the transmission shaft 6 with the above structure, the flexibility of position setting of the first torque output assembly 4 and the second torque output assembly 5 is improved, that is, whether the output end of the first torque output assembly 4 and the input end of the second torque output assembly 5 are at the same height or whether the connecting line between the both is straight, the transmission of the torque will not be affected, the setting flexibility of the frames is improved, the matching degree between the transmission shaft 6 and the frames is increased, the precision requirement for the frames is reduced, and the yield of the product is improved.

Figure 12:
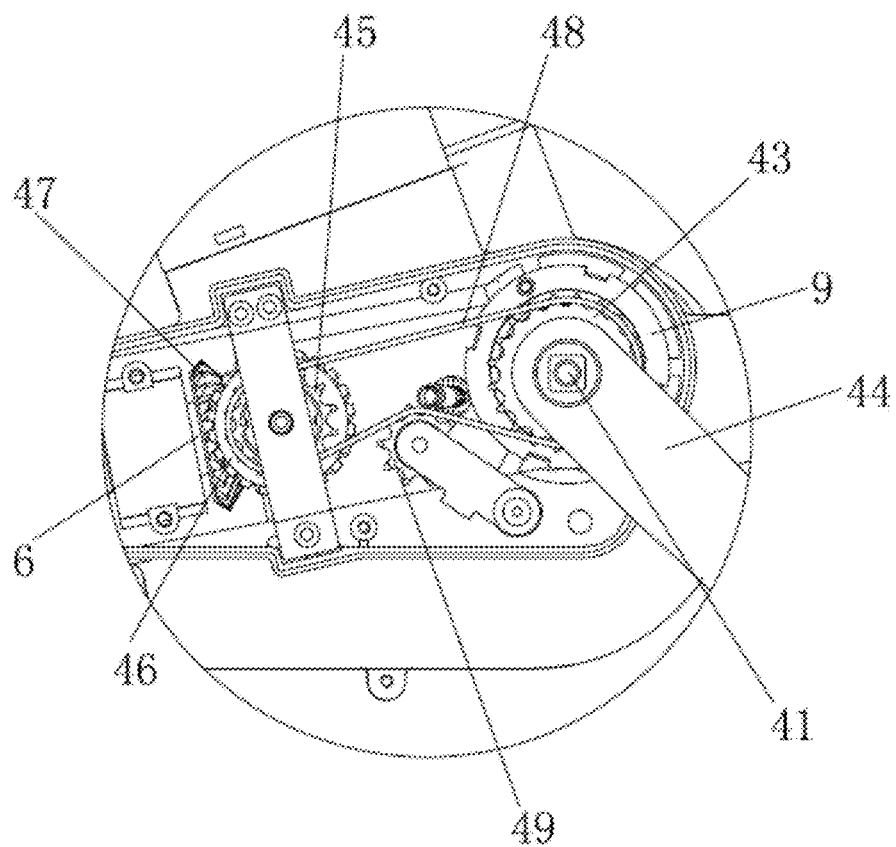
FIG. 12 is an enlarged view of B in FIG. 11.

With reference to FIGS. 12 and 13, according to the above embodiment of the present invention, the transmission shaft 6 comprises a first segmented transmission shaft 61, a second segmented transmission shaft 62 and a third segmented transmission shaft 63, the first segmented transmission shaft 61 and the second segmented transmission shaft 62 are connected via a first universal joint 64, and the second segmented transmission shaft 62 and the third segmented transmission shaft 63 are connected via a second universal joint 65, the first segmented transmission shaft 61 cooperates with the first torque output assembly 4, and the third segmented transmission shaft 63 cooperates with the second torque output assembly 5. In this embodiment, by using the three-segmented transmission shaft 6, least universal joints are used without affecting the design of the frames, and the smoothness of the transmission process and the reliability of transmission are ensured.

With reference to FIGS. 3, 4, 9, 11, 13 and 14, according to the above embodiment of the present invention, the front frame 1 comprises an assembly installation box 11 and a hollow connecting beam 12 arranged on the assembly installation box 11, one end of the hollow connecting beam 12 is connected to the assembly installation box 11, while the other end of the hollow connecting beam 12 is connected to the swinging mechanism 3, the transmission shaft 6 penetrates through the hollow connecting beam 12; The first torque output assembly 4 is arranged in the assembly installation box 11. By using the structure of the front frame 1, the first torque output assembly 4 and the transmission shaft 6 are covered by the front frame 1, and the transmission shaft 6 penetrates through the hollow connecting beam 12, without changing the basic structure of the frames, the torque output assembly and the transmission shaft 6 in the present invention are enclosed in the frames, thereby avoiding the contamination from external rain and sands, and ensuring the reliability and safety of the transmission system. A front beam 13 is arranged on the assembly installation box 11, a front fork and a handlebar are arranged on the front beam 13, and the front wheel 71 is arranged on the front fork. One end of the transmission shaft 6 cooperates with the first torque output assembly 4, while the other end of the transmission shaft 6 passes through the transmission via hole 331 to cooperates with the second torque output assembly, the swingable shaft-driven tricycle further comprises a seat, pedals arranged on the cranks and other components, which all are the existing technologies on the tricycle and will not be repeated here.

With reference to FIGS. 3, 4, 9, 11, 13 and 14, according to the above embodiment of the present invention, the rear frame 2 comprises a wheel frame 21 and a gear box 22 arranged on the wheel frame 21, the gear box 22 is connected to the swinging mechanism 3, the second torque output assembly 5 is arranged in the gear box 22, the rear wheels 72 are arranged on the wheel frame 21. The arrangement of the gear box 22 ensures that second torque output assembly 5 is in a closed environment, in combination with that the first torque output assembly 4 and the transmission shaft 6 are enclosed in the frames, the transmission agent of the present invention is completely enclosed in the frames, so that when the frames are not damaged by an external force, the lifelong free-of-maintenance can be realized, the reliability of the tricycle can be greatly improved, and the service life of the product can be prolonged.

Figure 3:
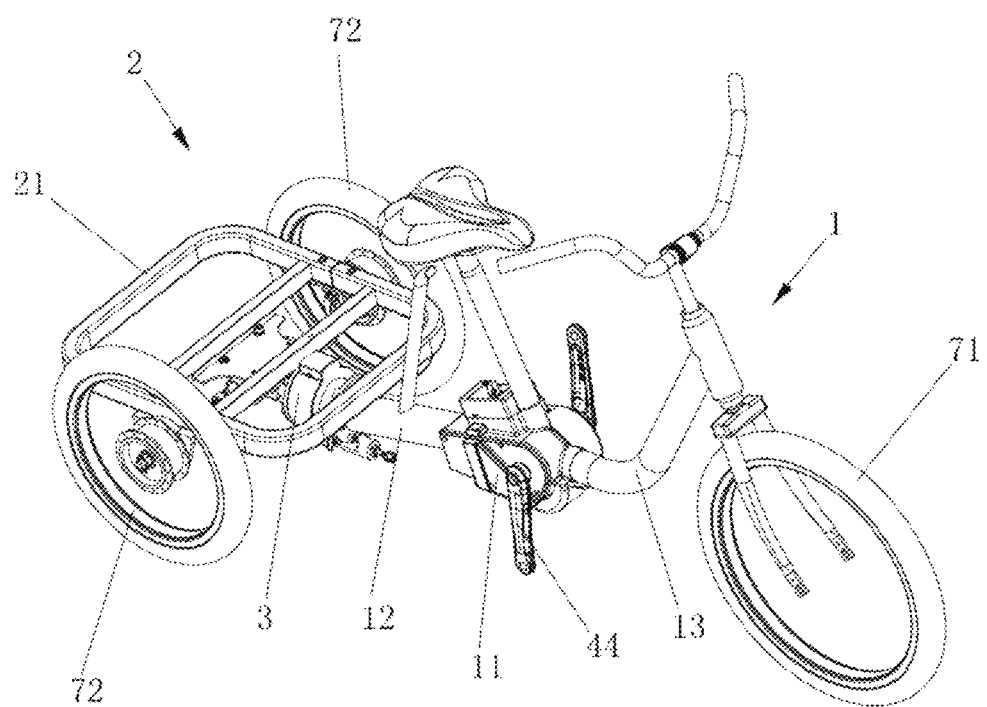
FIG. 3 is a structure diagram of a swingable shaft-driven tricycle according to the present invention.
Figure 4:
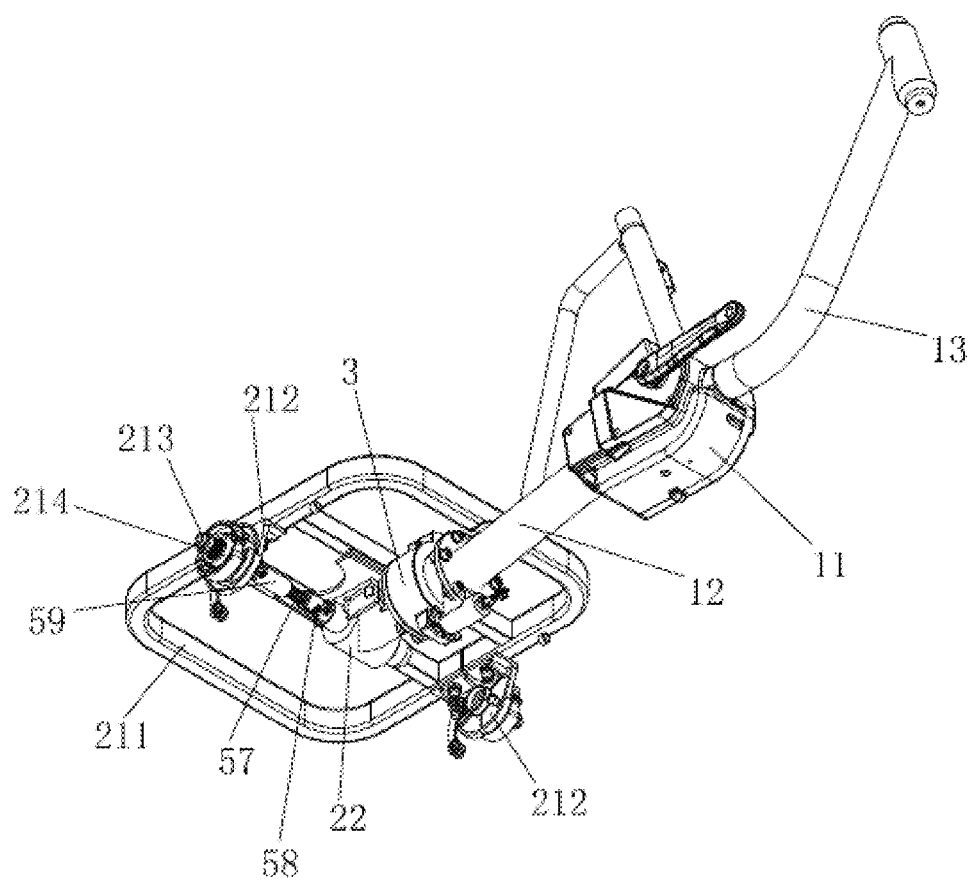
FIG. 4 is a structure diagram of the front frame, the swinging mechanism and the rear frame after being assembled together according to the present invention.
Figure 5:
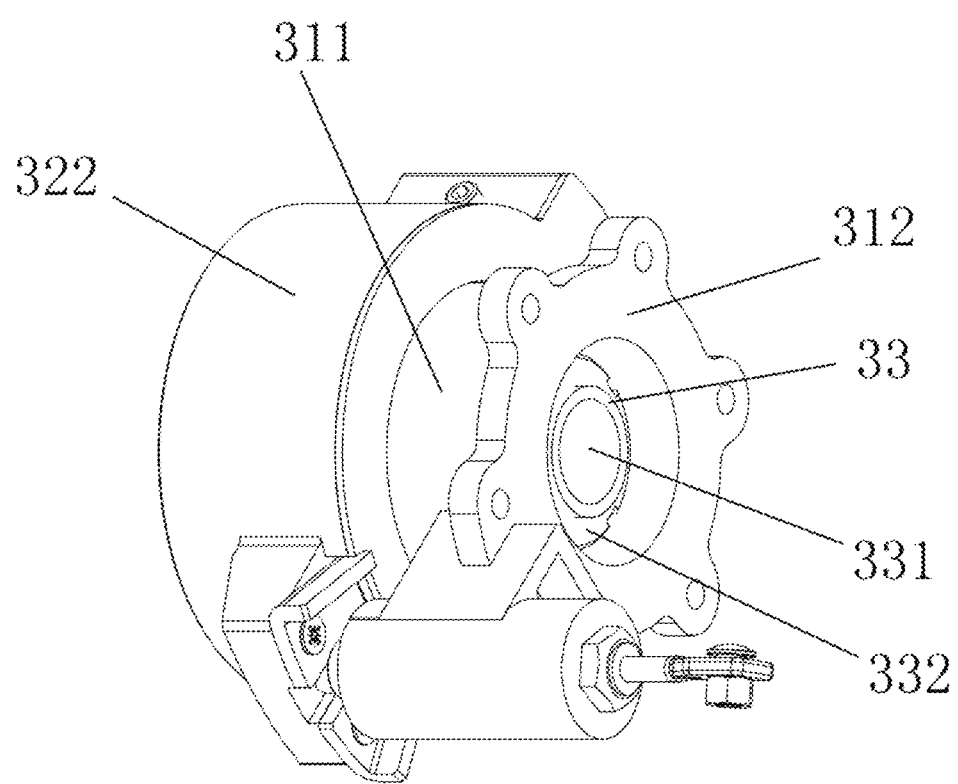
FIG. 5 is a structure diagram of the swinging mechanism according to the present invention.
Figure 6:
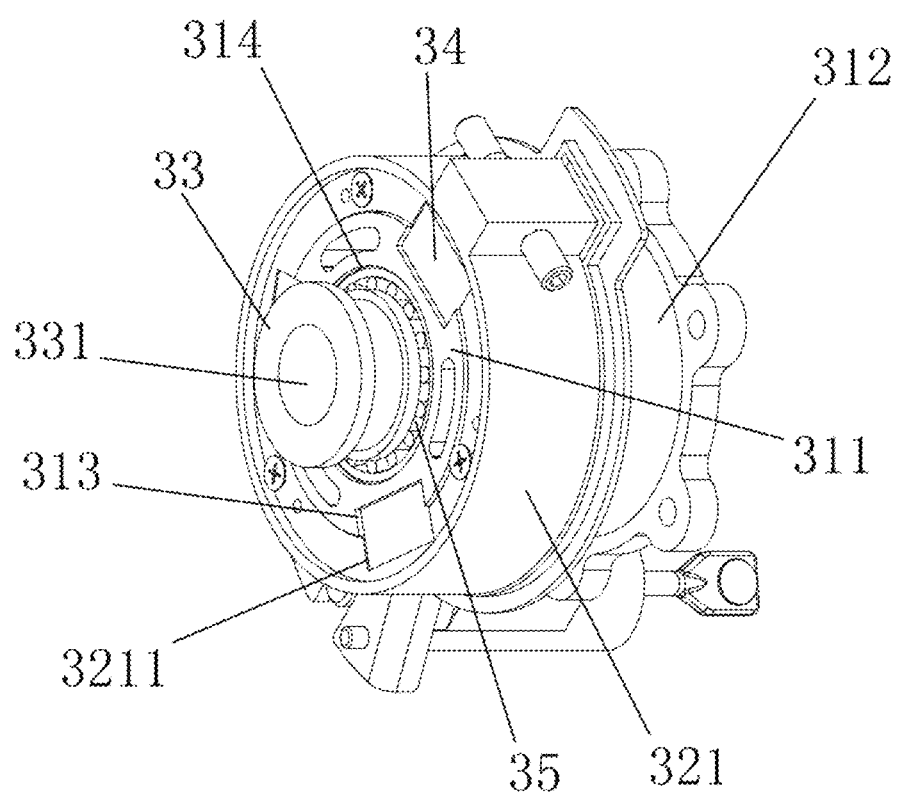
FIG. 6 is a structure diagram of the swinging mechanism according to the present invention after the connecting cover is removed.
Figure 7:
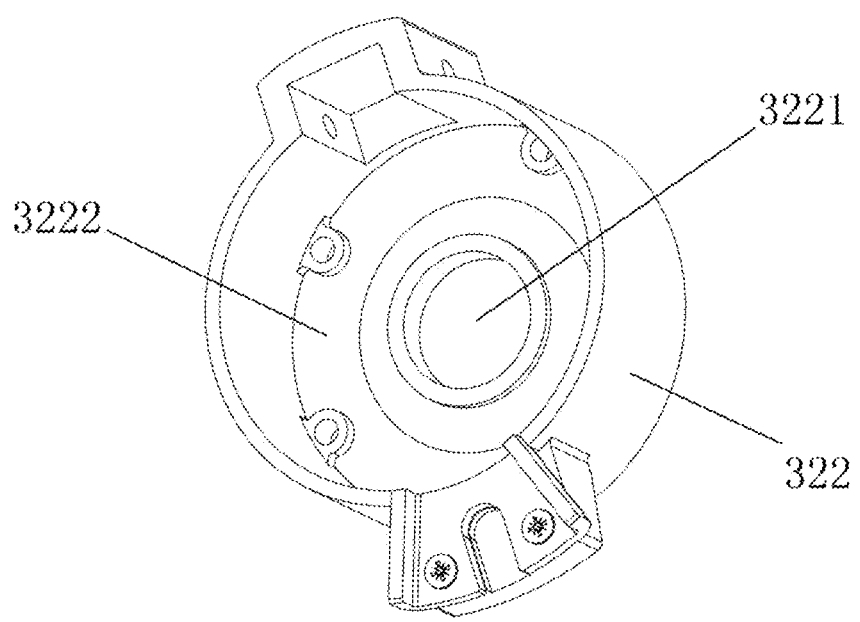
FIG. 7 is a structure diagram of the connecting cover of the swinging mechanism according to the present invention.
Figure 8:
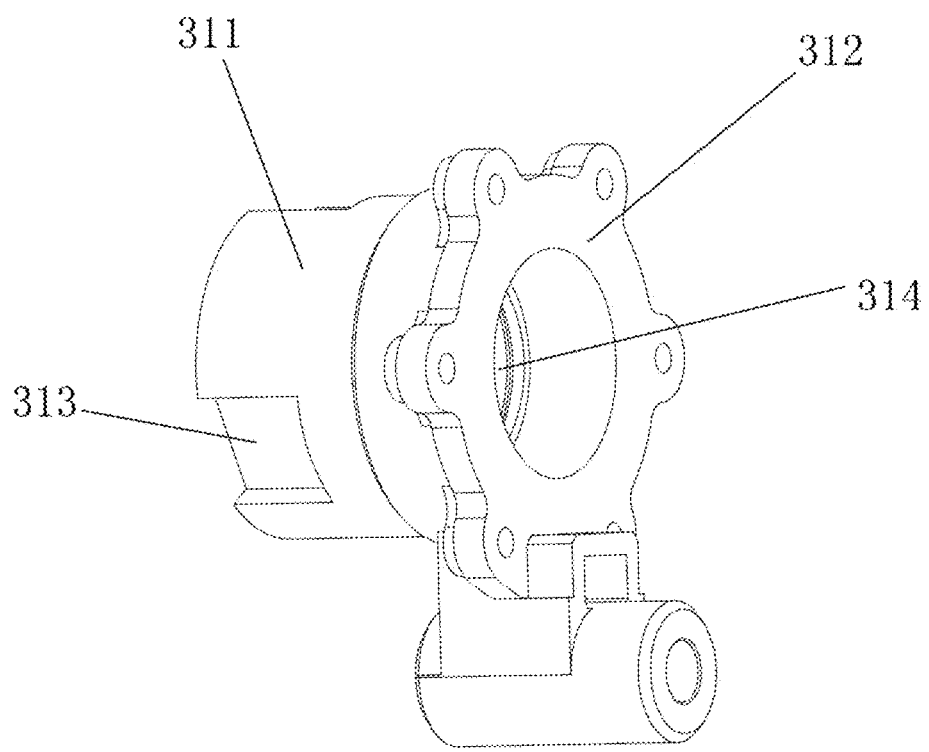
FIG. 8 is a structure diagram of the first swinging member of the swinging mechanism according to the present invention.
Figure 9:
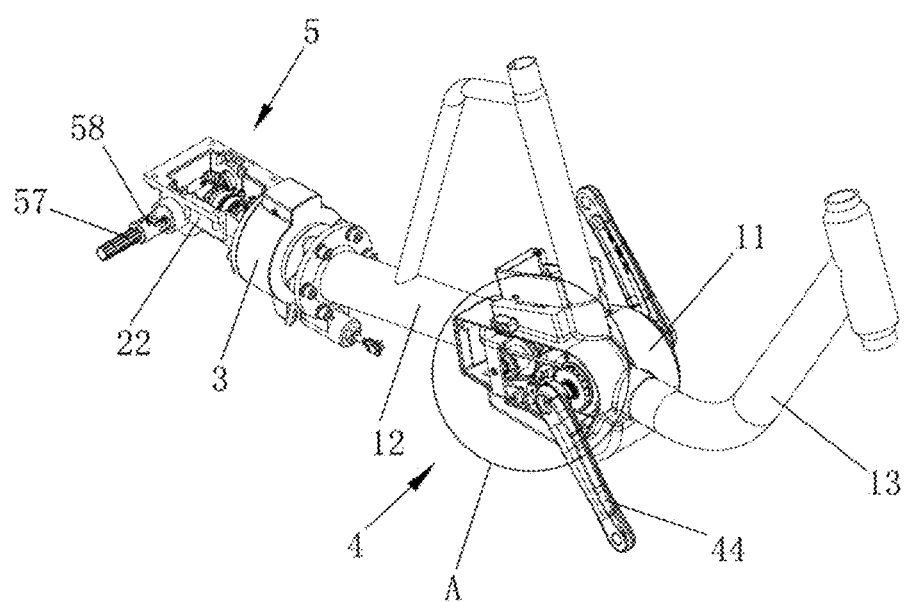
FIG. 9 is a structure diagram of a part of the front frame, the swinging mechanism and a part of the rear frame after being assembled together according to the present invention.
Figure 10:
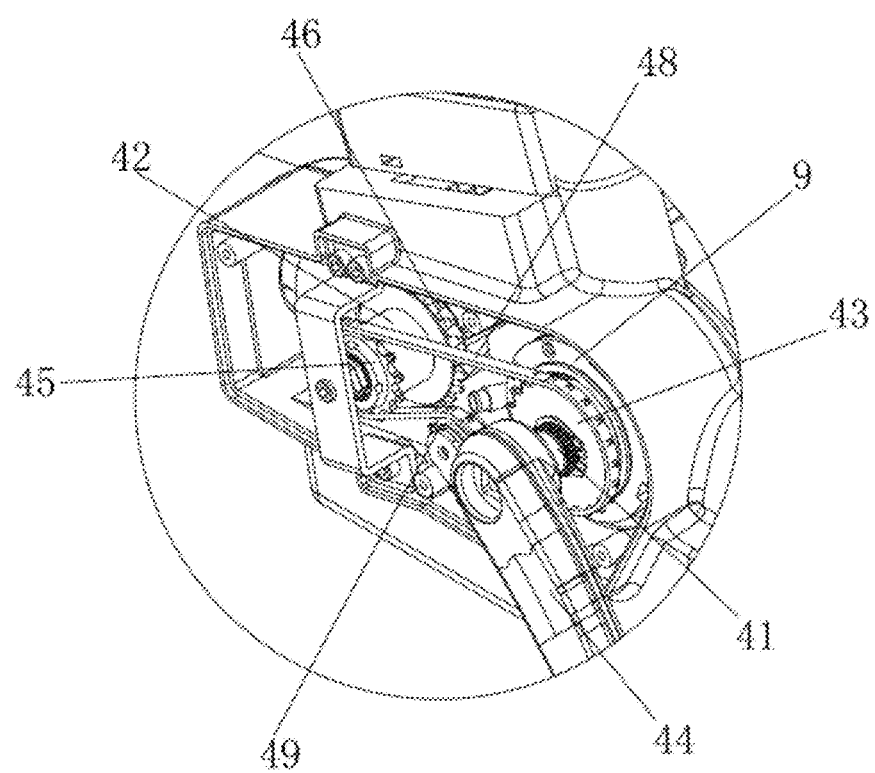
FIG. 10 is an enlarged view of A in FIG. 9.
Figure 11:
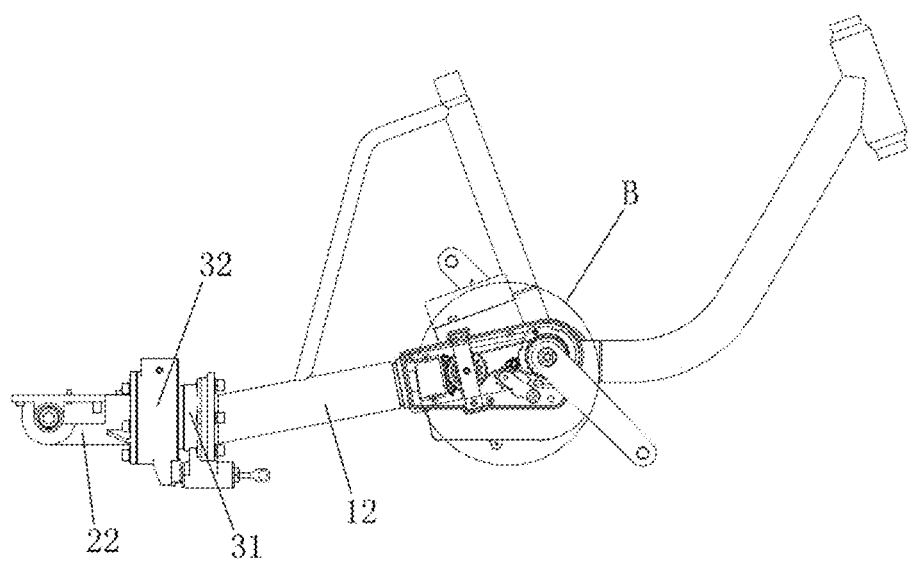
FIG. 11 is a side view of a part of the front frame, the swinging mechanism and a part of the rear frame after being assembled together according to the present invention.

With reference to FIGS. 3 and 4, according to the above embodiment of the present invention, the wheel frame 21 comprises a framework 211, two wheel installation members 212 symmetrically arranged on the framework 211 and wheel transmission shafts 213 arranged on the wheel installation members 212, the wheel transmission shafts 213 are arranged in a rotatable manner on the wheel installation members 212, and the rear wheels 72 are arranged on the wheel transmission shafts 213, the second torque output assembly 5 is at least connected to one of the wheel transmission shafts 213. This wheel frame 21 is simple in structure and easy to assemble, and the torque is transmitted to the rear wheels 72 through the wheel transmission shafts 213, compared with the prior art in which the wheel shaft does not rotate and the rear wheels 72 are equipped with sprocket and thus driven by chains 48 to rotate, it is unnecessary to assemble or disassemble any part in the transmission mechanism during assembling or disassembling of the rear wheels 72 (for example, in the prior art, it is necessary to assemble or disassemble the chains 48 or the like), so that the rear wheels 72 are simplified, particularly, during the assembling process of the driven rear wheels 72, the assembling efficiency is improved.

With reference to FIGS. 3 and 4, according to the above embodiment of the present invention, brake pad mechanisms 214 are arranged on the wheel installation members 212, brake drums or brake discs are arranged on the rear wheels 72, and the brake pad mechanisms 214 cooperates with the brake drums or brake discs. Both the disc brake and the drum brake are mature mechanisms in the prior art and will not be repeated here. In this embodiment, it is preferred to provide brake drums on the rear wheels 72, by using the above brake pad mechanisms 214, the reliability of braking is ensured in the present invention, and the safety of the rider is ensured.

With reference to FIGS. 9-12, according to the above embodiment of the present invention, the first torque output assembly 4 comprises a middle shaft 41 and a rear shaft 42 which are arranged in a rotatable manner on the front frame 1, a front sprocket 43 which is arranged on the middle shaft 41, cranks 44 which are arranged at two ends of the middle shaft 41, a rear sprocket 45 and a first bevel gear 46 which are arranged on the rear shaft 42. The front sprocket 43 is in linkage cooperation with the rear sprocket 45 through a chain 48, a second bevel gear 47 is arranged on the transmission shaft 6, and the first bevel gear 46 is meshed with the second bevel gear 47. This first torque output assembly 4 is simple in structure and flexible to assemble, and is particularly suitable for tricycles with rear wheels 72 having different diameters. When the driven wheels change in size, the speed ratio can be adjusted only by replacing a matched rear sprocket 45, without adjusting the whole set of first torque output assembly 4, with this structure, for automobile enterprises that produce multiple different types of vehicles, the types of parts are reduced, it is helpful for the standardization of assembly production lines, the production efficiency is improved, and the research and development cost for parts is reduced.

With reference to FIGS. 9-12, according to the above embodiment of the present invention, the middle shaft 41 and the rear shaft 42 are arranged in parallel, and the transmission shaft 6 is perpendicular to the rear shaft 42. It is easy to assemble parts, and the reliability and stability of the transmission mechanism are ensured. The first torque output assembly 4 further comprises a tighten sprocket 49 in compression cooperation with the chain 48. With the arrangement of the tighten sprocket 49, the loose chain 48 can be compressed tightly, thereby ensuring the adaptability of a chain 48 to a variety of sprockets of different sizes, the chain 48 in the first torque output assembly 4 is in a loose state after being adapted to the front and rear sprockets, using the tighten sprocket 49 for elastic tight compression, firstly, the chain 48 can be prevented from falling off; and secondly, when the rear sprocket 45 or the front sprocket 43 changes in diameter, the original chain 48 can still be used without adjusting the length of the chain 48.

With reference to FIGS. 4, 9 and 13-17, according to the above embodiment of the present invention, the second torque output assembly 5 comprises a torque output shaft 51 arranged on the rear frame 2, the transmission shaft 6 is in linkage with the torque output shaft 51 through a second gear pair, a clutch assembly is arranged between the transmission shaft 6 and the second gear pair or between the torque output shaft 51 and the second gear pair, in this embodiment, the clutch assembly is arranged between the transmission shaft 6 and the second gear pair, the torque output shaft 51 is in linkage cooperation with at least one of the two rear wheels 72. The torque output shaft 51 is in linkage cooperation with at least one of the two rear wheels 72 through a universal transmission shaft 57, one end of the universal transmission shaft 57 is connected to the torque output shaft 51 through a third universal joint 58, while the other end of the universal transmission shaft 57 is connected to the wheel transmission shaft 213 through a fourth universal joint 59. In this embodiment, the torque output shaft 51 is in linkage cooperation with one of the rear wheels 72, so that the second torque output assembly 5 effectively transmits the torque from the transmission shaft 6 to the torque output shaft 51 that is perpendicular to the transmission shaft 6, moreover, it has simple structure, few components, easy assembling and high reliability, with the arrangement of the clutch assembly, it is ensured that the rear wheels 72 can still rotate forward when the transmission shaft 6 is in stationary state, which conforms to the riding habit of the conventional transmission mechanism.

With reference to FIGS. 13-17, according to the above embodiment of the present invention, the second gear pair comprises a third bevel gear 53 and a fourth bevel gear 54 which are meshed with each other, the fourth bevel gear 54 is arranged on the torque output shaft 51, and the transmission shaft 6 is in linkage with the third bevel gear 53 through the clutch assembly. The clutch assembly comprises a torque input shaft 52 arranged on the third bevel gear 53, a first end face ratchet 521 arranged on the torque input shaft 52, an internal spline sleeve 55 clamped on the transmission shaft 6 in a sliding manner, and an elastic member 56 for pushing the internal spline sleeve 55 to abut against the first end face ratchet 521; One end of the torque input shaft 52 is connected to the third bevel gear 53, while the other end of the torque input shaft 52 is provided with the first end face ratchet 521, an external spline 66 is provided on the outer wall of the transmission shaft 6, the internal spline sleeve 55 is in sliding clamping cooperation with the external spline 66, a second end face ratchet 551 is arranged at the end of the internal spline sleeve 55 opposite to the first end face ratchet 521, and the first end face ratchet 521 cooperates with the second end face ratchet 551. When the transmission shaft 6 rotates forward, that is, when the transmission shaft 6 drives the second torque transmission assembly to drive the rear wheels 72 to rotate forward, the first end face ratchet 521 and the second end face ratchet 551 are in meshing state and can drive the second end face ratchet 551 to rotate accordingly; and, when the transmission shaft 6 rotates backward, the first end face ratchet 521 cannot be meshed with the second end face ratchet 551 and thus cannot drive the second end face ratchet 551 to rotate accordingly, meanwhile, when the rear wheels 72 that rotate forward drive the second end face ratchet 551 to rotate, the second end face ratchet cannot be meshed with the first end face ratchet 521 and thus cannot drive the first end face ratchet 521 to rotate. The clutch assembly has simple and compact structure, ingenious design and few components. The elastic member 56 is a spring sleeved on the transmission shaft 6. The elastic member 56 is a spring, and thus is easy to assemble, low in cost and high in reliability. A positioning insertion hole 522 is formed at the end of the torque input shaft 52 opposite to the transmission shaft 6, and the end of the transmission shaft 6 is inserted into the positioning insertion hole 522. This structure ensures the reliability of linkage among the transmission shaft 6, the clutch and the torque input shaft 52. The third bevel gear 53, the torque input shaft 52 and the first end face ratchet 521 are of an integral structure. Thus, it is easy to process and assemble the components, and the precision of the components is ensured.

Figure 2:
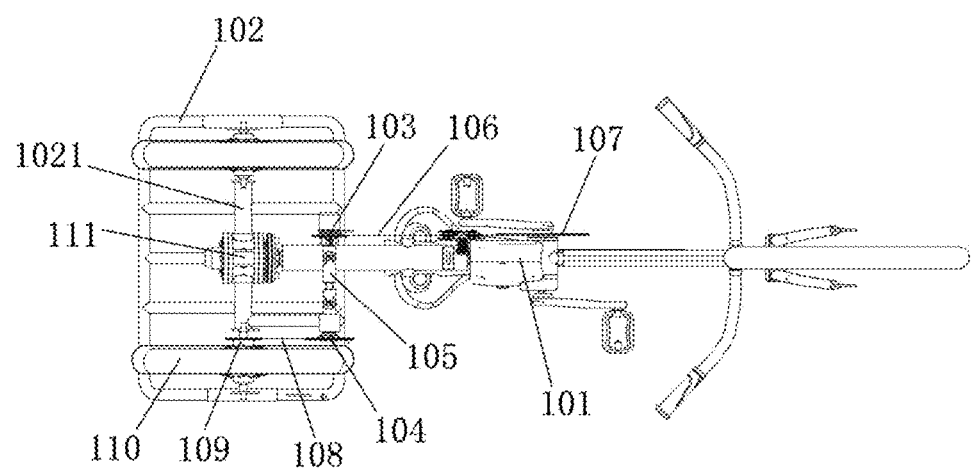
FIG. 2 is a bottom view of the tricycle with a swingable frame in the prior art.

With reference to FIGS. 1 and 2, according to the above embodiment of the present invention, the swingable shaft-driven tricycle further comprises a storage battery 8 arranged on the front frame 1 or the rear frame 2, a boosting motor (not shown in figures) arranged on the front wheel 71 and a torque sensor 9 arranged in the first torque output assembly 4, the torque sensor 9 is electrically connected to the boosting motor, and the storage battery 8 is connected to the torque sensor 9 and the boosting motor. In this embodiment, the storage battery 8 is arranged on the front frame 1, when the above structure is applied to an electric boosting tricycle, the reliability of the electric boosting tricycle is greatly improved, and the riding experience is greatly improved.

According to the above embodiment of the present invention, a torque trigger hole is formed on the torque sensor 9, the middle shaft 41 penetrates through the torque trigger hole, and the rotation of the middle shaft 41 triggers the torque sensor. The torque sensor with this structure can be directly triggered by the rotating shaft, that is, an extreme match to the electric boosting tricycle, so that it is helpful to simplify the overall structure of the first torque output assembly 4.

Embodiment 2

This embodiment is basically the same as Embodiment 1 in structure, except for the difference in the structure of the first torque output assembly, the first torque output assembly 4 comprises a middle shaft 41 arranged in a rotatable manner on the front frame 1 and cranks 44 arranged at two ends of the middle shaft 41, and the middle shaft 41 is in linkage with the transmission shaft 6 through a first gear pair. The first torque output assembly 4 has simple structure, few components and easy assembling.

Although the embodiments of the present invention have been shown and described, it should be understood by a person skilled in the art that variations can be made to these embodiments without departing from the principle and spirit of the present invention, and the scope of the present invention shall be defined by the appended claims and equivalents thereof.

The invention claimed is:

1. A swingable shaft-driven tricycle, comprising a front frame (1), a rear frame (2), and a transmission mechanism, with a front wheel (71) being arranged on the front frame (1), two rear wheels (72) being symmetrically arranged on the rear frame (2), and the front frame (1) being connected to the rear frame (2) through a swinging mechanism (3); wherein the transmission mechanism comprises a first torque output assembly (4) arranged on the front frame (1) and a second torque output assembly (5) arranged on the rear frame (2), the first torque output assembly (4) transmits torque to the second torque output assembly (5) through a transmission shaft (6), and, the second torque output assembly (5) is in linkage cooperation with at least one of the two rear wheels (72);

a transmission-via-hole (331) is formed in a middle portion of the swinging mechanism (3), the transmission shaft (6) passes through the transmission-via-hole (331), and the axis center line of the transmission shaft (6) located in the transmission-via-hole (331) coincides with the axis center line of the swinging mechanism (3).

2. The swingable shaft-driven tricycle according to claim 1, wherein the swinging mechanism (3) comprises a first swinging member (31), a second swinging member (32), a connecting shaft (33), and an elastic block (34); the elastic block (34) is clamped between the first swinging member (31) and the second swinging member (32), the first swinging member (31) and the second swinging member (32) are connected in a rotatable manner through the connecting shaft (33), the first swinging member (31) is connected to the front frame (1), the second swinging member (32) is connected to the rear frame (2), and, the transmission-via-hole (331) is formed in a middle portion of the connecting shaft (33).

3. The swingable shaft-driven tricycle according to claim 1, wherein the transmission shaft (6) comprises at least two segmented transmission shafts (6), and two adjacent segmented transmission shafts (6) are connected via a universal joint.

4. The swingable shaft-driven tricycle according to claim 1, wherein the transmission shaft (6) comprises a first segmented transmission shaft (61), a second segmented transmission shaft (62), and a third segmented transmission shaft (63); the first segmented transmission shaft (61) and the second segmented transmission shaft (62) are connected via a first universal joint (64), the second segmented transmission shaft (62) and the third segmented transmission shaft (63) are connected via a second universal joint (65); the first segmented transmission shaft (61) cooperates with the first torque output assembly (4), and, the third segmented transmission shaft (63) cooperates with the second torque output assembly (5).

5. The swingable shaft-driven tricycle according to claim 1, wherein the front frame (1) comprises an assembly installation box (11) and a hollow connecting beam (12) arranged on the assembly installation box (11); one end of the hollow connecting beam (12) is connected to the assembly installation box (11), while the other end of the hollow connecting beam (12) is connected to the swinging mechanism (3); the transmission shaft (6) penetrates through the hollow connecting beam (12), and, the first torque output assembly (4) is arranged in the assembly installation box (11).

6. The swingable shaft-driven tricycle according to claim 1, wherein the rear frame (2) comprises a wheel frame (21) and a gear box (22) arranged on the wheel frame (21); the gear box (22) is connected to the swinging mechanism (3), the second torque output assembly (5) is arranged in the gear box (22), and, the rear wheels (72) are arranged on the wheel frame (21).

7. The swingable shaft-driven tricycle according to claim 6, wherein the wheel frame (21) comprises a framework (211), two wheel installation members (212) symmetrically arranged on the framework (211), and wheel transmission shafts (213) arranged on the wheel installation members (212); the rear wheels (72) are arranged on the wheel transmission shafts (213); and, the second torque output assembly (5) is at least connected to one of the wheel transmission shafts (213).

8. The swingable shaft-driven tricycle according to claim 1, wherein the first torque output assembly (4) comprises a middle shaft (41) arranged in a rotatable manner on the front frame (1) and cranks (44) arranged at two ends of the middle shaft (41); and the middle shaft (41) is in linkage with the transmission shaft (6) through a first gear pair.

9. The swingable shaft-driven tricycle according to claim 1, wherein the first torque output assembly (4) comprises a middle shaft (41) and a rear shaft (42) which are arranged in a rotatable manner on the front frame (1), a front sprocket (43) arranged on the middle shaft (41), cranks (44) arranged at two ends of the middle shaft (41), a rear sprocket (45), and a first bevel gear (46) arranged on the rear shaft (42); the front sprocket (43) is in linkage cooperation with the rear sprocket (45) through a chain (48); a second bevel gear (47) is arranged on the transmission shaft (6); and, the first bevel gear (46) is meshed with the second bevel gear (47).

10. The swingable shaft-driven tricycle according to claim 1, wherein the second torque output assembly (5) comprises a torque output shaft (51) arranged on the rear frame (2), the transmission shaft (6) is in linkage with the torque output shaft (51) through a second gear pair, a clutch assembly is arranged between the transmission shaft (6) and the second gear pair or between the torque output shaft (51) and the second gear pair, and, the torque output shaft (51) is in linkage cooperation with at least one of the two rear wheels (72).

11. The swingable shaft-driven tricycle according to claim 10, wherein the second gear pair comprises a third bevel gear (53) and a fourth bevel gear (54) which are meshed with each other, the fourth bevel gear (54) is arranged on the torque output shaft (51), and, the transmission shaft (6) is in linkage with the third bevel gear (53) through the clutch assembly.

12. The swingable shaft-driven tricycle according to claim 11, wherein the clutch assembly comprises a torque input shaft (52) arranged on the third bevel gear (53), a first end face ratchet (521) arranged on the torque input shaft (52), an internal spline sleeve (55) clamped on the transmission shaft (6) in a sliding manner, and an elastic member (56) for pushing the internal spline sleeve (55) to abut against the first end face ratchet (521); one end of the torque input shaft (52) is connected to the third bevel gear (53), while the other end of the torque input shaft (52) is provided with the first end face ratchet (521); an external spline (66) is provided on the outer wall of the transmission shaft (6); the internal spline sleeve (55) is in sliding clamping cooperation with the external spline (66), a second end face ratchet (551) is arranged at the end of the internal spline sleeve (55) opposite to the first end face ratchet (521), and, the first end face ratchet (521) cooperates with the second end face ratchet (551).

13. The swingable shaft-driven tricycle according to claim 1, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

14. The swingable shaft-driven tricycle according to claim 2, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

15. The swingable shaft-driven tricycle according to claim 3, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

16. The swingable shaft-driven tricycle according to claim 4, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

17. The swingable shaft-driven tricycle according to claim 5, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

18. The swingable shaft-driven tricycle according to claim 6, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

19. The swingable shaft-driven tricycle according to claim 8, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

20. The swingable shaft-driven tricycle according to claim 10, further comprising a storage battery (8) arranged on the front frame (1) or the rear frame (2), a boosting motor arranged on the front wheel (71) and a torque sensor (9) arranged in the first torque output assembly (4); with the torque sensor (9) being electrically connected to the boosting motor, and the storage battery (8) being connected to the torque sensor (9) and the boosting motor.

\* \* \* \* \*